United States Patent [19]
Santoro et al.

[11] Patent Number: 4,766,289
[45] Date of Patent: Aug. 23, 1988

[54] LIGHT WEIGHT, VERY FAST TEMPERATURE COMPENSATING SOLDERING IRON

[76] Inventors: Giovanni Santoro, Via Campodimele, 55; Ermanno Francolini, V. Campo Ligure 19, both of Rome, Italy

[21] Appl. No.: 877,386

[22] Filed: Jun. 23, 1986

Related U.S. Application Data

[63] Continuation-in-part of Ser. No. 524,203, Aug. 18, 1983, abandoned.

[30] Foreign Application Priority Data

Aug. 18, 1982 [IT] Italy .............................. 49004 A/82

[51] Int. Cl.[4] .............................................. A05B 1/00
[52] U.S. Cl. .................................. 219/235; 219/233; 219/236; 219/497; 219/507
[58] Field of Search ........................ 219/10.77, 233, 235, 219/240, 238, 236, 492, 493, 497, 499, 507–509

[56] References Cited

U.S. PATENT DOCUMENTS

| | | | |
|---|---|---|---|
| 915,974 | 3/1909 | Leonard | 219/235 |
| 2,969,449 | 1/1961 | Tyler | 219/235 |
| 3,400,251 | 9/1968 | Coyle et al. | 219/235 |
| 4,114,010 | 9/1978 | Lewis | 219/10.77 |
| 4,115,676 | 9/1978 | Higuchi et al. | 219/10.77 |
| 4,147,910 | 4/1979 | Kikuchi et al. | 219/10.77 |
| 4,506,126 | 3/1985 | Smets | 219/10.77 |
| 4,540,866 | 9/1985 | Okuda | 219/10.77 |

FOREIGN PATENT DOCUMENTS 3023909 8/1982 Fed. Rep. of Germany .
55-44653 3/1980 Japan .

OTHER PUBLICATIONS

IBM Technical Disclosure Bulletin, vol. 23, No. 11, Apr. 1981, Coombs et al.

IBM Technical Disclosure Bulletin, vol. 23, No. 10, Mar. 1981, Coombs et al.

Primary Examiner—M. H. Paschall
Attorney, Agent, or Firm—Bacon & Thomas

[57] ABSTRACT

A soldering tool wherein the soldering tip comprises part of a single loop of iron that forms the energizer means, temperature sensor, heating element and solder melting member. The power oscillator comprises a primary transformer coil that is in series with a primary capacitor to form an LC resonance circuit. The primary transformer coil is inductively linked to the iron loop so that the resistance of the soldering tip forms a load resistance on the LC resonance circuit. The power supply includes first and second power transistors connected to a source of DC current. The base of each power transistor is inductively linked to the primary transformer coil so that the power transistors alternately conduct and supply power to the power oscillator. The frequency and amplitude of oscillations in the power oscillator determines how often and how long the power transistors conduct. Both the frequency and amplitude of the power oscillations decrease with an increase in the load resistance on the power oscillator caused by ohmic heating of the soldering tip. Thus, the temperature of the soldering tip determines how much power the soldering tip receives. The temperature of the soldering tip is regulated by determining at what temperature the load resistance becomes so great that the power oscillator damps out too quickly to draw enough power from the power supply to continue oscillating. A triggering circuit periodically starts the the power supply so that the power oscillator may oscillate again after being damped out. The present invention may respond to an excessive temperature within a single period of oscillation of the power oscillator and may supply additional power to the soldering tip at the frequency of the triggering circuit.

17 Claims, 3 Drawing Sheets

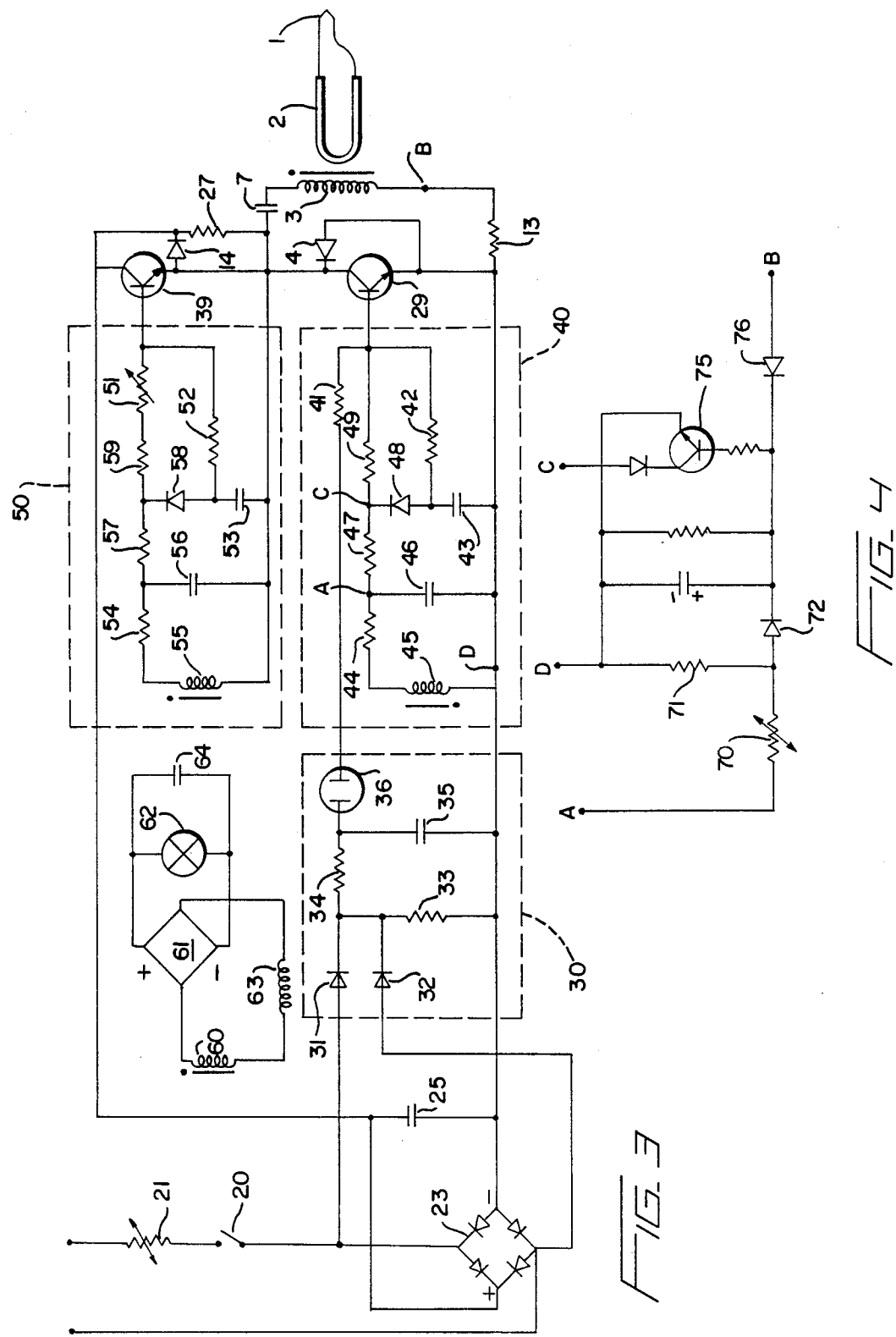

LIGHT WEIGHT, VERY FAST TEMPERATURE COMPENSATING SOLDERING IRON

RELATED APPLICATIONS

The present application is a continuation in part of Ser. No. 524,203 filed Aug. 18, 1983 now abandoned.

BACKGROUND OF THE INVENTION

1. Field of the Invention

This invention relates to a lightweight soldering iron having a temperature control for soldering soft solders such as tin.

2. Description of the Related Art

Soldering irons may be divided into three categories. One category comprises a soldering iron with a simple switch control that applies full power to the soldering tip as soon as the switch is closed so that the soldering tip quickly reaches an operating temperature sufficient to melt the solder. A soldering iron in this first category draws a relatively constant amount of power with little regard to the amount of power actually required to melt solder. Thus, the temperature of the soldering tip is too low when the soldering iron is used to quickly melt a large amount of solder so that the soldering iron is ineffective. Increasing the power supplied to the soldering tip, however, can produce too high a temperature if the amount of power dissipated in melting the solder suddenly decreases. An excessive temperature may cause the soldering tip to become "burned" or to "alloy" with the solder and make the soldering tip inoperative.

A second category of soldering iron uses a continuously energized resistance element and controls the temperature of the soldering tip by dissipating excess heat. Soldering irons in this second category can easily overheat the soldering tip so that the solder alloys to the tip and makes the tip inoperative.

A third category of soldering iron uses a thermostatic control to interrupt the current supply whenever the soldering tip reaches an excessive temperature. This category of soldering iron requires a significant amount of time to adjust the current supply to compensate for a change in the temperature of the soldering tip.

The use of any known soldering iron to make, for example electronic circuit boards, requires the user to exercise great care to avoid burning the solder or to avoid damaging the circuit being soldered. These necessary precautions add considerable time to the soldering process and, hence, to the time required to produce a final product.

SUMMARY OF THE INVENTION

The present invention relates to a soldering iron wherein an energizing means supplies power to a soldering tip comprising a solder melting member, heating element and temperature sensor. The power supplied to the soldering tip quickly responds to changes in temperature and maintains the soldering tip at a constant temperature.

A heating element is placed in a series circuit with an energizing means. The energizing means is coupled to a power oscillator which is coupled to a power supply. The frequency of oscillation of the power oscillator determines the frequency at which the power supply oscillates. The amplitude of the oscillations determines how long the power oscillator supplies power. The resistance of the heating element determines both the oscillation frequency of the power oscillator and the amplitude of the oscillations. Since the resistance of the heating element increases with temperature, the heating element acts as a temperature sensor that determines the amount of power supplied to the power oscillator. The solder melting member temperature sensor and heating element can be combined in the soldering tip for greater simplicity.

In the preferred embodiment of the present invention, the soldering tip comprises a single loop of iron that forms the energizing means, temperature sensor, heating element and solder melting member. The power oscillator comprises a primary transformer coil that is in series with a primary capacitor to form an LC resonance circuit. The primary transformer coil is inductively linked to the iron loop so that the resistance of the soldering tip forms a load resistance on the LC resonance circuit. The power supply comprises first and second power transistors connected to a source of DC current. The base of each power transistor is inductively linked to the primary transformer coil so that the power transistors alternately conduct and supply power to the power oscillator. The frequency and amplitude of oscillations in the power oscillator determines how often and how long the power transistors operate. Both the frequency and amplitude of the power oscillations decrease with an increase in the load resistance on the power oscillator caused by ohmic heating of the soldering tip. Thus, the temperature of the soldering tip determines how much power the soldering tip receives.

The temperature of the soldering tip is regulated by determining at what temperature the load resistance becomes so great that the power oscillator damps out too quickly to draw enough power from the power supply to continue oscillating. A triggering circuit periodically starts the the power supply so that the power oscillator may oscillate again after being damped out. The present invention may respond to an excessive temperature within a single period of oscillation of the power oscillator and may supply additional power to the soldering tip at the frequency of the triggering circuit.

BRIEF DESCRIPTION OF THE DRAWINGS

FIG. 3 is a circuit arrangement for the preferred embodiment of the soldering iron of the present invention;

FIG. 4 is a circuit arrangement for a failsafe circuit to be used in conjunction with the circuit arrangement shown in FIG. 3;

DETAILED DESCRIPTION OF THE PREFERRED EMBODIMENT

Figure 1:
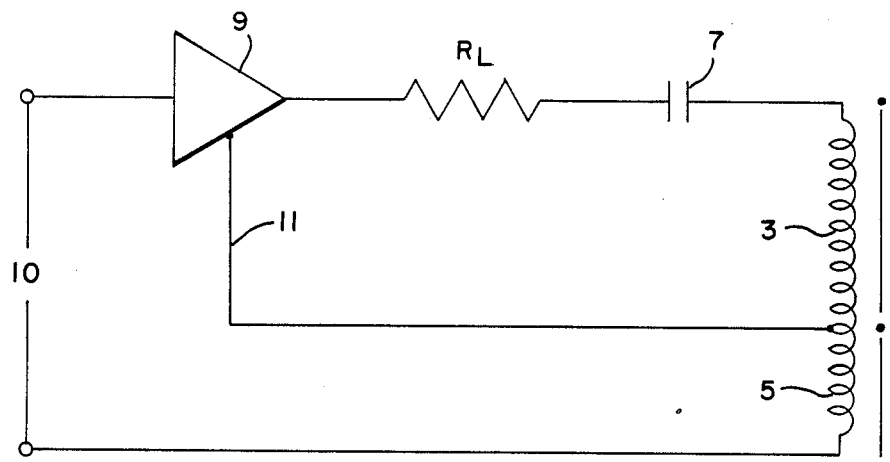
FIG. 1 is an equivalent circuit for the present invention.

The principles of operation for the present invention may be understood with the aid of the equivalent circuit shown in FIG. 1. A primary transformer coil 3 is connected in series with a load resistance $R_L$. The power supply for the primary transformer coil comprises a current control device 9 such as a thyristor, transistor, tri-state buffer or operational amplifier in series with a source of DC current across terminals 10. A control line 11 extends from the junction of primary transformer coil 3 with secondary transformer coil 5 to current control device 9. The magnitude of the voltage on control line 11 determines conductive state of current control device 9.

In operation, the circuit arrangement shown in FIG. 1 begins operating when a triggering circuit, not shown, enables current control device 9 to conduct. Primary transformer coil 3 and primary capacitor 7 form an LC series resonance circuit that produces an oscillatory current through load resistor $R_L$ so long as the load resistance $R_L$ satisfies the relationship $R_L^2 < 4L/C$, where L and C are the values for the inductance of the primary transformer coil 3 and capacitance of the primary capacitor 7, respectively. Further, the oscillating current across primary transformer coil 3 necessarily varies the voltage across secondary transformer coil 5 and, hence, changes the value of the voltage along control line 11. The LC resonance of the primary transformer coil and primary capacitor effectively determines the frequency of oscillation of the conductive state of current control device 9. The duration of the voltage determines how long current control device 9 conducts and is determined in part by the amplitude of the power oscillations.

Figure 2:
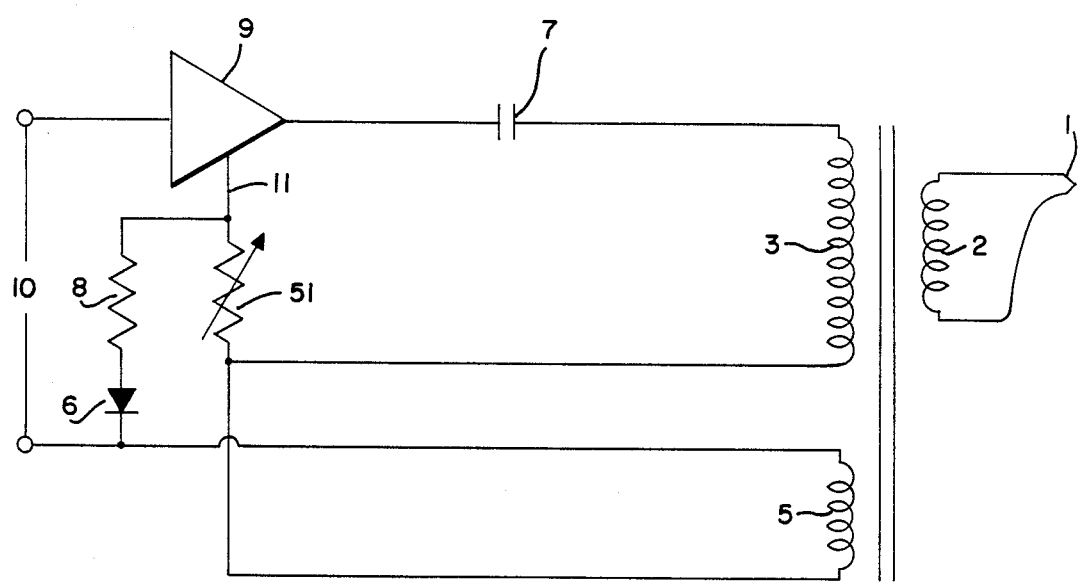
FIG. 2 is a circuit arrangement for a soldering iron used in accordance with the present invention.

In the circuit arrangement shown in FIG. 2 the load resistor $R_L$ is replaced by a secondary transformer coil 2 in series with a soldering tip 1. The soldering tip 1 comprises a heating element with a resistance value that depends on temperature. Secondary transformer coil 2 is inductively linked to primary transformer coil 3 so that the combined reactance of tip member 1 and secondary transformer coil 2 forms a load impedance in the LC resonance circuit formed by primary transformer coil 3 and primary capacitor 7. The total amount of power transmitted to variable resistor 1 by the primary transformer coil 3 depends on the frequency of oscillation w which itself depends on the load impedance $Z_L$ according to the relationship $$w^2 = \left( \frac{1}{L_p C} - \frac{Z_L^2}{4L_p^2} \right).$$

Since the load impedance $Z_L$ depends on the magnitude of the resistance of the soldering tip, a greater load resistance produces a slower oscillatory frequency and, hence, a lesser rate of power transfer at higher temperatures.

It is also to be appreciated that the amplitude of the voltage across secondary transformer coil 5 decreases when the temperature of the soldering tip increases due to the reduction in the current flow through the primary transformer coil produced by the increased load impedance. The voltage on control line 11, however, determines the conductive state of current control device 9. Thus, current control device 9 supplies no power to the power oscillator if the voltage across secondary transformer coil 5 is too low and only a little power if the voltage is greater than the conduction threshold level for only a short period of time.

The frequency of oscillation of the power oscillator decreases with increasing temperature and the amplitude of the voltage signal across the secondary transformer also decreases with increasing temperature. Thus, any heating of the soldering tip causes the power control device to conduct less current to the power oscillator less often so that the current flow in the soldering tip decreases and thereby reduces ohmic heating in the heating element.

The resonance behavior of the circuit shown in FIG. 1 can be expressed in terms of the quality factor Q. Accepting the standard definition of Q as $$Q = w_0 L/R$$
$$= w_0 E/P$$

where L and R are the inductance and resistance of the circuit, $w_0$ is the resonance frequency of the circuit corresponding to the frequency of maximum power transfer. $E = \frac{1}{2} L I^2$ is the energy present in the circuit and $P = \frac{1}{2} R_L I^2$ is the average power dissipated by the load resistance. It can be shown that the quality factor for the entire circuit $Q_r$ shown in FIGS. 1 or 2 becomes $$Q_r = \frac{Q_t}{1 - \frac{Q_t}{Q_o}},$$

where $Q_r$ corresponds to the quality of the entire circuit, $Q_o$ corresponds to the quality of the circuit at the reference temperature, and $Q_t$ corresponds to the quality of the circuit at the operating temperature. It is clear that the quality factor tends toward infinity as the operating temperature tends toward the reference temperature, signifying that the average power transferred to the load resistance approaches zero as the temperature of the soldering tip approaches the reference temperature. The soldering iron of the present invention thus prevents the soldering tip from becoming overheated.

Controlling the level of the voltage on control line 11 may determine the final temperature of soldering tip 1. The voltage on control line 11 can be controlled by forming a voltage divider across the control port of current control device 9 with a fixed resistor 8 and a potentiometer 51. Increasing the resistance of the potentiometer decreases the amplitude of the voltage signals on control line 11 so that current control device 11 conducts for a shorter period of time and transfers less power to the power oscillator. Diode 6 forms a clipper circuit on control line 11 to prevent the current control device from becoming reversed biased. A second current control device and second secondary transformer coil may be added to the circuit to supply power to the power oscillator during the alternate phase of the power oscillator.

Soldering tip 1 acts as a thermostat for regulating its own temperature because it is also the heating element for the soldering iron and part of the load resistance on the power oscillator. The present invention thus permits the soldering tip to quickly receive a large amount of current through the power supply and power oscillator because the circuit containing the soldering tip automatically rejects any current flow that produces excessive heating. A circuit arrangement such as shown in FIG. 2 could adjust to an increase in the temperature of the soldering tip within as little as one period of oscillation of the power oscillator, presumed to typically be on the order of hundreds of microseconds.

The circuit arrangement shown in FIG. 2 becomes inoperative after initially heating the soldering tip to a temperature at or near the preselected reference temperature. Thus, a triggering circuit should be added to periodically reenable the current control device to conduct.

FIG. 3 shows a circuit arrangement comprising the preferred embodiment of the present invention. Variable resistor 1 is the tip of the soldering iron. Secondary transformer coil 2 comprises a single loop of conductive material such as iron. It has been found that a single conductive loop on the secondary transformer coil provides adequate current flow to the soldering tip. Primary transformer coil 3 and primary capacitor 7 comprise the inductor capacitor of the LC resonant series circuit which forms the power oscillator. An additional resistor 13 is added in series with primary transformer coil 3 for reasons explained below in connection with FIG. 4.

Switch 20 controls the supply of alternating current to the circuit. NTC 21 controls the amount of power supplied to the power supply. The AC input power is connected across a bridge rectifier 23 and storage capacitor 25. The bridge rectifier comprises four diodes and the storage capacitor is preferably an electrolytic capacitor that reduces the voltage ripple from the bridge rectifier. Primary transformer coil 3 receives the DC signal from storage capacitor 25 through resistors 13 and 27. A first power transistor 29 connects primary capacitor 7 directly to the negative terminal of the bridge rectifier by conducting. A second power transistor 39 connects primary capacitor 7 directly to the positive terminal of rectifier 23 by conducting.

The resonance oscillation between primary transformer coil 3 and primary capacitor 7 and the power transistors is initiated by triggering circuit 30. Diodes 31 and 32 through resistor 33, form a second branch of a full wave rectifier 23. The diodes supply trigger circuit 30 with a pulsed DC current that is not smoothed by storage capacitor 25. A low pass filter comprising resistor 34 and capacitor 35 transmits the voltage pulses from diodes 31 and 32 to the low vacuum discharge tube 36. Resistor 34 has a high resistance value, typically on the order of one megaohm. Capacitor 35 is thus forced to discharge through low vacuum discharge tube 36 so as to create a sharply defined trigger pulse for first power transistor 29.

It is to be appreciated that trigger circuit 30 fires at twice the frequency of the AC input signal. The AC input signal is normally household line current which means that trigger circuit 30 has a frequency of approximately 120 Hz in the United States and 100 Hz in most of Europe or a period of 8 and 10 milliseconds, respectively.

The output voltage from trigger circuit 30 supplies a first control circuit 40. As shown in FIG. 3, the trigger pulse is divided by resistors 41 and 42 and AC coupled to the negative terminal of rectifier 23 through capacitor 43. Power transistor 29 enters a conductive state each time trigger circuit 30 fires, thus shorting primary capacitor 7 to the voltage terminal. The sudden decrease of voltage across the capacitor draws current through primary capacitor 7 and commences the LC oscillation between primary transformer coil 3 and primary capacitor 7. A diode 4 is positioned to shunt current in the reverse direction around power transistor 29.

The current flow through primary transformer coil 3 induces a current flow through a first secondary transformer coil 45. The base of the first power transistor 29 is connected to the output of first secondary transformer coil 45 through a control circuit. Resistor 44 and capacitor 46 form a low pass filter. A second low pass filter comprises a resistor 47 and the capacitor 43. Additionally, diode 48 forms a clipping circuit to pass an AC signal from the negative terminal of the voltage rectifier to the base of the first power transistor 29. The clipping circuit functions to prevent the base of power transistor 29 from being severely reversed biased by the current induced in the first secondary transformer coil 45. The low pass filters of the first and second stages of the control circuit prevent high frequency oscillations from changing the conductive state of first power transistor 29. The low pass filters also function as a phase change network that shifts the phase of the signal induced in first secondary transformer coil 45.

A second control circuit 50 controls second power transistor 39. A second secondary transformer coil 55 is inductively linked to primary transformer coil 3 and directly electrically linked to primary capacitor 7. Control circuit 50 also comprises a low pass filter formed from resistor 54 and capacitor 56. A second low pass filter is formed from resistor 57 and capacitor 53. Diode 58 forms a clipping circuit to prevent reverse biasing the base of second power transistor 39. The output voltage of the control circuit is divided across fixed resistors 59 and 52. Further, a potentiometer 51 is inserted into the voltage divider to permit adjusting the voltage at the base of second power transistor 39 and, hence, the conductive state of the second power transistor as is more fully explained in connection with FIG. 5. Potentiometer 51 is the temperature adjustment control for the soldering tip.

The circuit arrangement shown in FIG. 3 operates as follows: a trigger pulse from trigger circuit 30 enables first power transistor 29 to conduct. Current oscillates between primary capacitor 7 and primary transformer coil 3 through resistor 13, power transistor 29 and diode 4. The current flow in primary transformer coil 3 induces current flow through primary secondary transformer coil 2 and heats soldering tip 1. Simultaneously, current flow is induced in the first and second coils 45 and 55. The induced current in first secondary transformer coil 45 reduces the voltage at the base of first power transistor 29 so that the transistor stops conducting. Simultaneously, the induced current in second secondary transformer coil 55 increases the voltage at the base of second power transistor 39 so that the second power transistor is brought into conduction. Second power transistor 39 recharges primary capacitor 7 more quickly than would be possible through resistor 27 alone. The rapid recharge of primary capacitor 7 reinitializes the oscillation of the power oscillator so as to continue transferring power to primary secondary coil 2. The length of time during which second power transistor 39 is conductive determines the rate at which power is transmitted to primary transformer coil 3 and, hence, the temperature of the tip of the soldering iron.

The circuit arrangement shown in FIG. 3 may malfunction if both power transistors conduct for a long period of time at the same time, shorting the terminal of bridge rectifier 23 and overheating. Therefore, FIG. 4 discloses a failsafe circuit arrangement to protect the power transistors against overheating. A thermistor 70 and fixed resistor 71 form a voltage divider between points A and D of FIG. 3. The thermistor is positioned near the emitter of the first and second power transistors. As the transistors heat, the resistance of the resistor 71 increases and the voltage increase across the resistor 71 is transmitted across diode 72 to the base of transistor 75. A sufficient increase in voltage enables transistor 75 to conduct so that points C and D of FIG. 3 are shorted. The effect of shorting points C and D is to directly connect the base of first power transistor 29 to the negative terminal of rectifier 23 so that the power transistor stops conducting, and breaks the short circuit.

If the core of primary transformer coil 3 becomes overheated, the induction of the primary transformer coil decreases and begins to function as a short circuit. A short across the primary transformer coil produces a high current flow across resistor 13 and a high voltage at point B of FIG. 3. As shown in FIG. 4, point B is connected to the base of transistor 75 through diode 76. An increase in voltage at point B throws transistor 75 into conduction so as to short points C and D and remove all power from the primary transformer coil 3.

Finally, the preferred embodiment of the present invention employs a lamp 62 to provide light to the work area. Lamp 62 is inductively linked to the primary transformer coil 3 by a third secondary transformer coil 60 across a second bridge rectifier 61. An inductor 63 and capacitor 64 are provided to smooth out a variation in voltage from the bridge rectifier 61.

Figure 5:
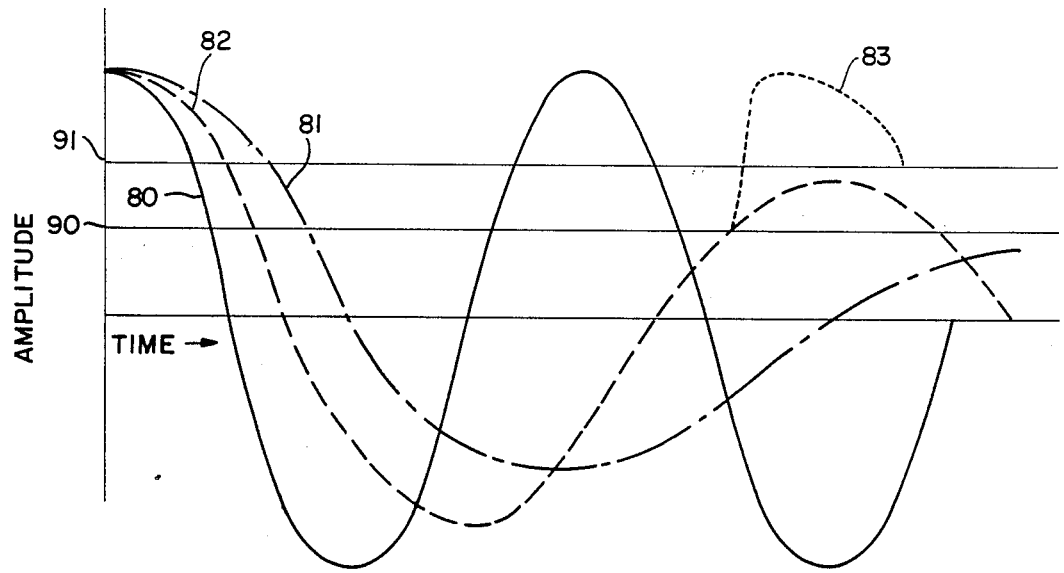
FIG. 5 is a sketch of the phase relationship of current in the circuit arrangement shown in FIG. 2.

FIG. 5 is a schematic representation of the voltage across secondary transformer coil 5 which form the signals on control line 11 of the circuit arrangement shown in FIG. 2. Sinusoidal waveform 80 represents the voltage across the secondary transformer coil 5 when the soldering tip is cool. Current control device 9 begins to conduct each time the voltage signal increases above first threshold level 90, thus increasing the voltage across secondary transformer 5 so that the voltage oscillation continues indefinitely.

Sinusoidal waveform 81 represents the voltage across the secondary transformer coil when the soldering tip is hot. The voltage never exceeds the threshold value 90 so that the power control device does not supply additional power to the power oscillator. The resonance oscillation between primary capacitor 7 and primary transformer coil 3 quickly damps out so that the soldering tip receives little additional power.

Sinusoidal waveform 82 represents the voltage across the secondary transformer coil for intermediate temperatures. As shown, the value of the reference voltage briefly rises above conduction threshold 90 by a relatively small amount. If the current control device is sensitive to the voltage level of the control line, then the current control device conducts less power which causes the resonance to damp out faster because the voltage across the secondary transformer coil is less in subsequent cycles. If, however, the conductivity of the current control device is independent of the amplitude of the voltage on control line 11, then the current control device delivers full power to the power oscillator, producing a larger voltage change across the secondary transformer coil and a larger voltage value as represented by waveform 83. The power oscillator receives more power so that the tip of the soldering iron heats faster and the voltage value on control line 11 more quickly approaches the high temperature performance represented by waveform 81. In either instance, the frequency at which additional current reaches the power oscillator decreases so that the soldering tip receives less power.

Increasing the resistance of potentiometer 51 increases the voltage required across secondary transformer coil 5 to enable current control device 9 to conduct. Thus, the power oscillator stops receiving power at a lower temperature. The increase in the required voltage is represented by threshold 91 of FIG. 5. As illustrated, the intermediate temperature waveform 82 no longer causes the current control device to enter into conduction so that the temperature of the soldering tip is limited to a lower temperature.

Figure 6:
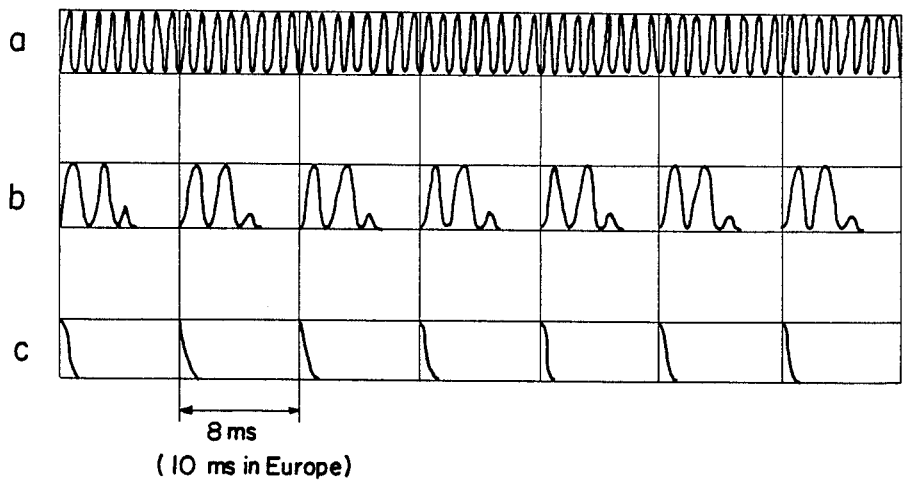
FIG. 6 illustrates the operation of the circuit arrangement shown in FIG. 3.

FIG. 6 shows how power is transferred to the soldering tip of the circuit arrangement shown in FIG. 4. FIG. 6a represents the operation of circuit arrangement when the temperature of the soldering tip is relatively cool. The power oscillator is in continuous operation so that the soldering tip may receive essentially all the power supplied to the power supply across NTC 21 that is available to the soldering tip.

FIG. 6b represents the operation of the circuit arrangement when the soldering tip is at an intermediate temperature. The soldering tip receives power in wave packets having a duration corresponding to the time required for the resonance circuit of the power oscillator to damp out. The frequency at which the wave packets repeat corresponds to the frequency of the pulses from trigger circuit.

Finally, FIG. 6c represents the performance of the circuit at relatively high temperatures of the soldering tip. The soldering tip receives power after each trigger pulse. The power oscillator, however, damps out quickly after each trigger pulse because of the greater resistance of the soldering tip so that little additional power is transferred to the soldering tip.

The principles, preferred embodiments and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the present invention. For example, the series LC resonance circuit could be replaced with a parallel LC resonance circuit. Accordingly, the foregoing detailed description should be considered exemplary in nature and not as limiting to the scope and spirit of the invention as set forth in the appended claims.

What is claimed is:

1. A soldering iron, comprising:
    a soldering tip having a loop of conductive material for receiving current, said soldering tip having a resistance element for ohmicly producing heat, said resistive element having a resistance value that increases with temperature;
    a power oscillator coupled to said soldering tip to produce current flow in said loop, said power oscillator transferring power to said soldering tip until said soldering tip reaches a predetermined temperature.

2. A soldering iron as claimed in claim 1, wherein said power oscillator has an oscillation frequency and oscillation amplitude; and
    said power oscillator is coupled to said soldering tip so that said oscillation frequency is proportional to the resistance value of said resistance element and said current amplitude is inversely proportional to said resistance value.

3. A soldering iron as claimed in claim 2, wherein said power oscillator comprises a primary capacitor and a primary transformer coil to form an LC resonance circuit; and said loop of conductive material is inductively coupled to said primary transformer coil so that power may be transferred to said soldering tip by inducing a current flow in said conductive loop and said resistive element comprises a load resistance on said LC resonance circuit.

4. A soldering iron as claimed in claim 3, further comprising:
a control line coupled to said power oscillator to produce a voltage signal; and
a current control device having a conductive state determined by the magnitude of said voltage signal.

5. A soldering iron as claimed in claim 4, wherein said voltage signal is indicative of the oscillation amplitude of said power oscillator.

6. A soldering iron as claimed in claim 4, wherein said voltage signal is indicative of the oscillation frequency of said power oscillator.

7. A soldering iron as claimed in claim 4, wherein said voltage signal is indicative of the oscillation amplitude of said power oscillator and the oscillation frequency of the power oscillator.

8. A soldering iron as claimed in claim 4, wherein
said power oscillator comprises a primary capacitor and a primary transformer coil to form an LC resonance circuit;
said loop of conductive material is inductively coupled to said primary transformer coil so that power may be transferred to said soldering tip by inducing a current flow in said conductive loop and said resistive element comprises a load resistance on said LC resonance circuit; and
said voltage signal is produced by an inductive coupling with said LC resonance circuit.

9. A soldering iron as claimed in claim 8, wherein said current control device further comprising:
first and second power transistors; and
first and second secondary transformer coils that are inductively coupled to said primary transformer coil and electrically coupled to the base of said first and second power transistors, respectively, to produce first and second control signals; and
first and second control lines to carry said first and second control signals to the base of said first and second transistors, respectively.

10. A soldering iron as claimed in claim 1, further comprising a triggering circuit for periodically restarting said power oscillator after said soldering tip reaches said predetermined temperature.

11. A soldering iron as claimed in claim 4, further comprising a triggering circuit for periodically restarting said power oscillator after said soldering tip reaches said predetermined temperature, said trigger circuit throwing said current control device into conduction to restart the power oscillator.

12. A method of operating a soldering iron, comprising:
supplying electric power to a power oscillator;
coupling said power oscillator to a primary secondary coupling means to produce an electric current in said primary secondary coupling means;
connecting said primary secondary coupling means to a soldering tip, said soldering tip having a resistivity that produces ohmic heating in response to said electric current, said resistivity increasing with temperature; and
transferring power from said power oscillator to said soldering tip until said resistivity indicates that said soldering tip has obtained a predetermined temperature.

13. A method of operating a soldering iron as claimed in claim 12, wherein:
said primary coupling means and said secondary coupling means are transformer coils; and
said coupling comprises inductively connecting said transformer coils.

14. A method of operating a soldering iron as claimed in claim 12, further comprising the steps of:
coupling a first secondary coupling means to said primary coupling means;
forming a first control signal from said first secondary coupling means; and
controlling the conductivity of a first current control device with said control signal, said first current control device controlling the supply of power to said power oscillator.

15. A method of operating a soldering iron as claimed in claim 14, further comprising the steps of periodically supplying a trigger signal to said first current control device to periodically through it into conduction and restart said power oscillator.

16. A method of operating a soldering iron as claimed in claim 12, further comprising the steps of:
coupling a second secondary coupling means to said primary coupling means;
forming a second control signal from said secondary coupling means; and
controlling the conductivity of a current control device with said control signal, said current control device controlling the supply of power to said power oscillator.

17. A method of operating a soldering iron as claimed in claim 16, further comprising the step of shifting the phase of said first and second control signals through first and second phase inversion networks.

* * * * *

UNITED STATES PATENT AND TRADEMARK OFFICE
CERTIFICATE OF CORRECTION

PATENT NO. : 4,766,289

DATED : August 23, 1988

INVENTOR(S) : SANTORO ET AL

It is certified that error appears in the above-identified patent and that said Letters Patent is hereby corrected as shown below:

Claim 1 should read as follows:

1. A soldering iron, comprising:

a soldering tip electrically connected to a loop of electrically conductive material for receiving current, said soldering tip having a resistance element for ohmically producing heat, said resistance element having a resistance value that increases with temperature; and a power oscillator coupled to said loop to produce current flow in said loop, and thus to transfer power to said soldering tip, said power oscillator transferring power to said soldering tip until said soldering tip reaches a predetermined temperature, and electrical feedback loop means arranged to modulate the output of the power oscillator in response to the temperature of the soldering tip, so that the tip resistance controls the output of the power oscillator to thereby maintain the tip at said predetermined temperature.

COLUMN 8, Claim 2, line 64, after "is" insert --inversely--;
line 66, delete "current" and insert --oscillation--.

COLUMN 9, Claim 3, line 3, delete "and";
line 7, after "loop" insert --;--;
line 8, delete "resistive" and insert --resistance--.

COLUMN 10, Claim 11, line 1, delete "trigger" and insert --triggering--;
line 2, delete "throwing" and insert --enabling conduction of--; delete "into conduction";
line 3, before "restart" insert --thereby--.

UNITED STATES PATENT AND TRADEMARK OFFICE
CERTIFICATE OF CORRECTION

PATENT NO. : 4,766,289

DATED : August 23, 1988

INVENTOR(S) : SANTORO ET AL

It is certified that error appears in the above-identified patent and that said Letters Patent is hereby corrected as shown below:

COLUMN 10, Claim 12 should read as follows:

12. A method of operating a soldering iron, comprising:
supplying electric power to a power oscillator;
coupling said power oscillator to a first secondary coupling means to produce an electric current in said first secondary coupling means;
electrically connecting said first secondary coupling means to a soldering tip, said soldering tip having a resistance that produces ohmic heating in response to said electric current, said resistance increasing with temperature;
transferring power from said power oscillator to said soldering tip until said soldering tip has obtained a predetermined temperature; and
modulating the output of the power oscillator in response to the temperature of the soldering tip, so that the tip resistance controls the output of the power oscillator to thereby maintain the tip at said predetermined temperature.

Claim 13 should read as follows:

13. A method of operating a soldering iron as claimed in claim 12, wherein:
said power oscillator includes a primary transformer coil and said first secondary coupling means is a secondary transformer coil, and
said primary transformer coil and said first secondary coupling means are inductively coupled.

Claim 14, line 27, delete "first" and insert --second--;
line 28, delete "primary coupling means" and insert --power oscillator--;
line 29, delete "said first" and insert --said second--;
line 33, before "control" insert --first--.

UNITED STATES PATENT AND TRADEMARK OFFICE
CERTIFICATE OF CORRECTION

PATENT NO. : 4,766,289

DATED : August 23, 1988

INVENTOR(S) : SANTORO ET AL

Page 3 of 3

It is certified that error appears in the above-identified patent and that said Letters Patent is hereby corrected as shown below:

COLUMN 10,

Claim 15, line 36, delete "steps" and insert --step--;
        line 37, delete "first";
        line 38, delete "through it into conduction and" and insert --enable said current control device to conduct and thus to--.

Claim 16, line 42, delete "12" and insert --14--;
        line 43, delete "second" and insert --third--;
        line 44, delete "primary coupling means" and insert --power oscillator--;
        line 45, after "said" insert --third--;
        line 47, before "current" insert --second--;
        line 48, before "control" insert --second--; and before "current" insert --second--.

Signed and Sealed this

Twenty-third Day of May, 1989

*Attest:*

*Attesting Officer*

DONALD J. QUIGG

*Commissioner of Patents and Trademarks*